Feb. 20, 1968 W. F. GERDES ET AL 3,369,984
CONTROL APPARATUS
Filed March 4, 1966 2 Sheets-Sheet 1

INVENTORS.
Walter F. Gerdes
Hogan A. Randle
BY
Earl D. Ayers
AGENT

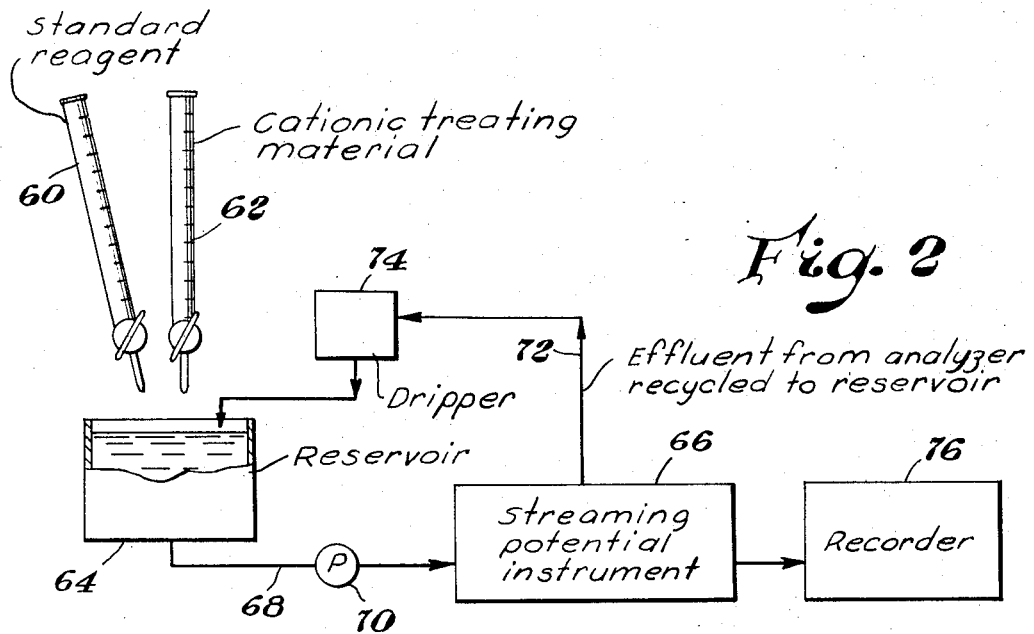
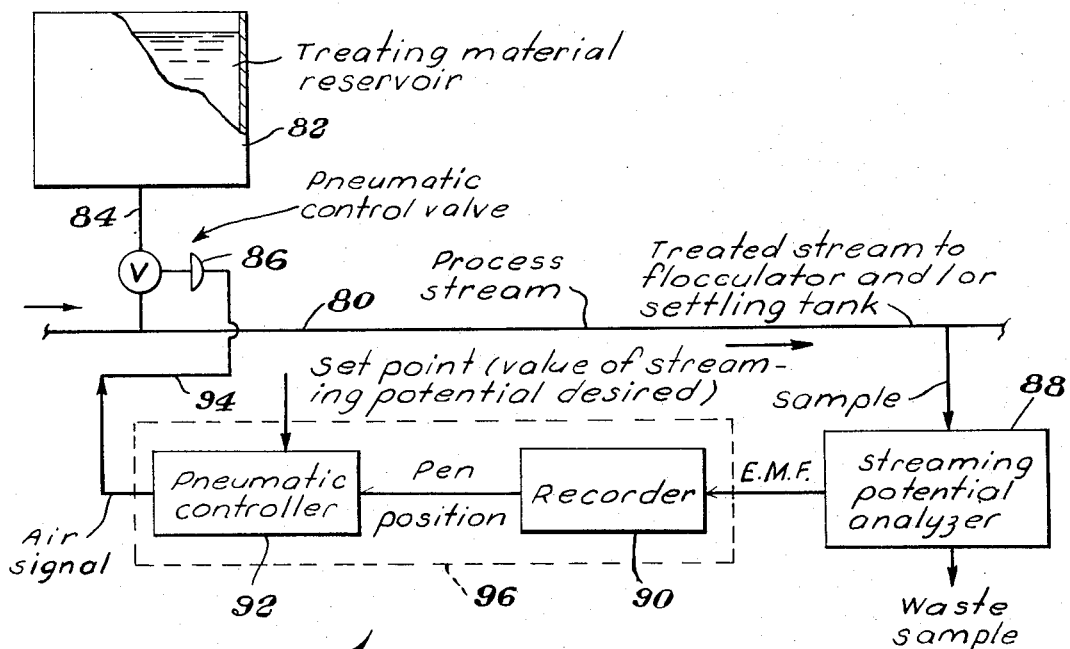

United States Patent Office 3,369,984
Patented Feb. 20, 1968

3,369,984
CONTROL APPARATUS
Walter F. Gerdes, Lake Jackson, and Hogan A. Randle, Angleton, Tex., assignors to The Dow Chemical Company, Midland, Mich., a corporation of Delaware
Continuation-in-part of application Ser. No. 315,532, Oct. 11, 1963. This application Mar. 4, 1966, Ser. No. 540,127
13 Claims. (Cl. 204—195)

This application is a continuation-in-part of our co-pending application Serial No. 315,532, filed Oct. 11, 1963, for "Control Apparatus and System," now abandoned.

This invention relates to novel apparatus for developing an electrical signal which can be utilized in the essentially continuous regulation of flocculation of aqueous suspensions of finely divided charged solid particles and for other uses.

It is conventional practice in clarifying aqueous systems containing suspended particles to employ a flocculation operation. Once flocculated, the suspended particles can be separated from their water medium by sedimentation, filtration, flotation, centrifugation, or one or more of the foregoing physical separatory processes in combination. Conventionally, the flocculation operation is promoted by the use of flocculating chemicals such as alum, ferric chloride and various polymeric materials such as water-soluble cationic and anionic organic polyelectrolytes. Aqueous suspensions of finely divided particles are encountered in natural or raw water supplies such as rivers and lakes and in municipal and industrial wastes, which latter systems include a substantial proportion of suspended organic particles.

In a typical flocculation process for the clarification of municipal sewage, a water-soluble cationic flocculating chemical is added to the sewage. The sewage normally comprises suspended negatively charged organic particles and thus the addition of the cationic agent results in charge neutralization on the suspended particles. When the average charge is zero, or at some other predetermined value found by experimentation, the dispersed organic particles undergo flocculation, i.e., aggregation, at an optimum rate. Too much cationic agent, however, creates positively charged organic particles which can be as difficult to flocculate as are the originally negatively charged particles.

To date, however, determining on a substantially continuous basis how much chemical to add to the stream to be treated has been difficult, especially since the composition of such streams often varies over fairly wide ranges in time intervals of a few minutes to a few hours.

Various empirical approaches to "finding" the correct dosage of flocculant to be added to a stream have been used. For example, increasing amounts of flocculant may be added to samples from the stream and the amount of decrease in turbidity of the stream noted, the correct dosage being determined as the one which causes the greatest decrease in turbidity with the least addition of flocculant. Such a procedure is time consuming and therefore not really suitable where the composition of the treated stream varies.

Another approach is to use a so-called Zeta meter to determine the charge condition existing in the stream. The Zeta meter is used to observe the time required for a charged particle from the stream to pass a predetermined distance along a liquid path while under the influence of an electric field. This method is time consuming and requires a technician to perform the test and to interpret test results before the stream is treated with a greater, lesser, or the same amount of flocculant as had been used since the last previous Zeta meter test was made.

The usual methods of determining the dosage of flocculant to be added to a stream having suspended charged particles are discontinuous and require a substantial amount of individual labor in making the tests. The use of such tests in controlling flocculation of such streams is costly both from the standpoint of the labor involved and from the fact that the amount of flocculant actually required by the stream may vary from that indicated by the tests.

Accordingly, a principal object of this invention is to provide an improved instrument which is useful in controlling the dosage of chemicals to be added to a controllable stream having a charged condition existing therein.

Another object of this invention is to provide an improved system for metering the addition of flocculant to a stream having dispersed charged particles therein.

A further object of this invention is to provide an improved instrument for developing, on a substantially continuous basis, an electrical signal which is a function of the charge condition existing in a stream containing charged particles therein.

In accordance with this invention, there is provided apparatus wherein a sample stream taken from a process stream or sample reservoir is passed through a capillary having electrically insulating walls, the capillary having reversible electrodes at each of its ends, for a predetermined time. A stream of displacement fluid, such as distilled water, for example, is then passed through the capillary for a predetermined period of time, during the latter part of which time a measurement of the potential developed across the electrodes is made.

It should be emphasized that the purpose of the displacement fluid is not to change the charge density of the stream, but to eliminate the low reading across the electrodes by reducing the conductivity of the flowable material while the reading is made.

As a system for controlling the dosage of a flocculant to a process stream, the output potential developed across the electrodes is applied to an e.m.f. recorder whose pen drive is disengaged except during the time a potential reading is made, the output of the recorder being coupled to a set point controller, the set point being the value of developed potential which produces the requisite degree of flocculation of the particles in the dosed process stream. The output of the controller (pneumatic, electrical, or hydraulic, for example) is applied to a control valve which is coupled between a treating material (flocculant, for example) reservoir and a point along the process stream sufficiently upstream from where the sample stream is taken to permit mixing of the treating material with the process stream before the sample is withdrawn from the stream.

As the potential developed across the electrodes in the capillary (or capillary substitute) varies from the set potential, the output of the controller causes the control valve to admit either an increased or decreased amount of flocculant to the process stream. When the potential developed across the electrodes equals the set point potential of the controller, there is, of course, no change in the amount of chemical (flocculant) which is added to the process stream.

The invention, as well as additional objects and advantages thereof, will best be understood when the following detailed description is read in connection with the accompanying drawings, in which:

FIG. 2 is a diagrammatic view showing the instrument of FIG. 1 used in a titration operation, and FIG. 3 shows, in diagrammatical form, a process control system in accordance with this invention.

Figure 1:
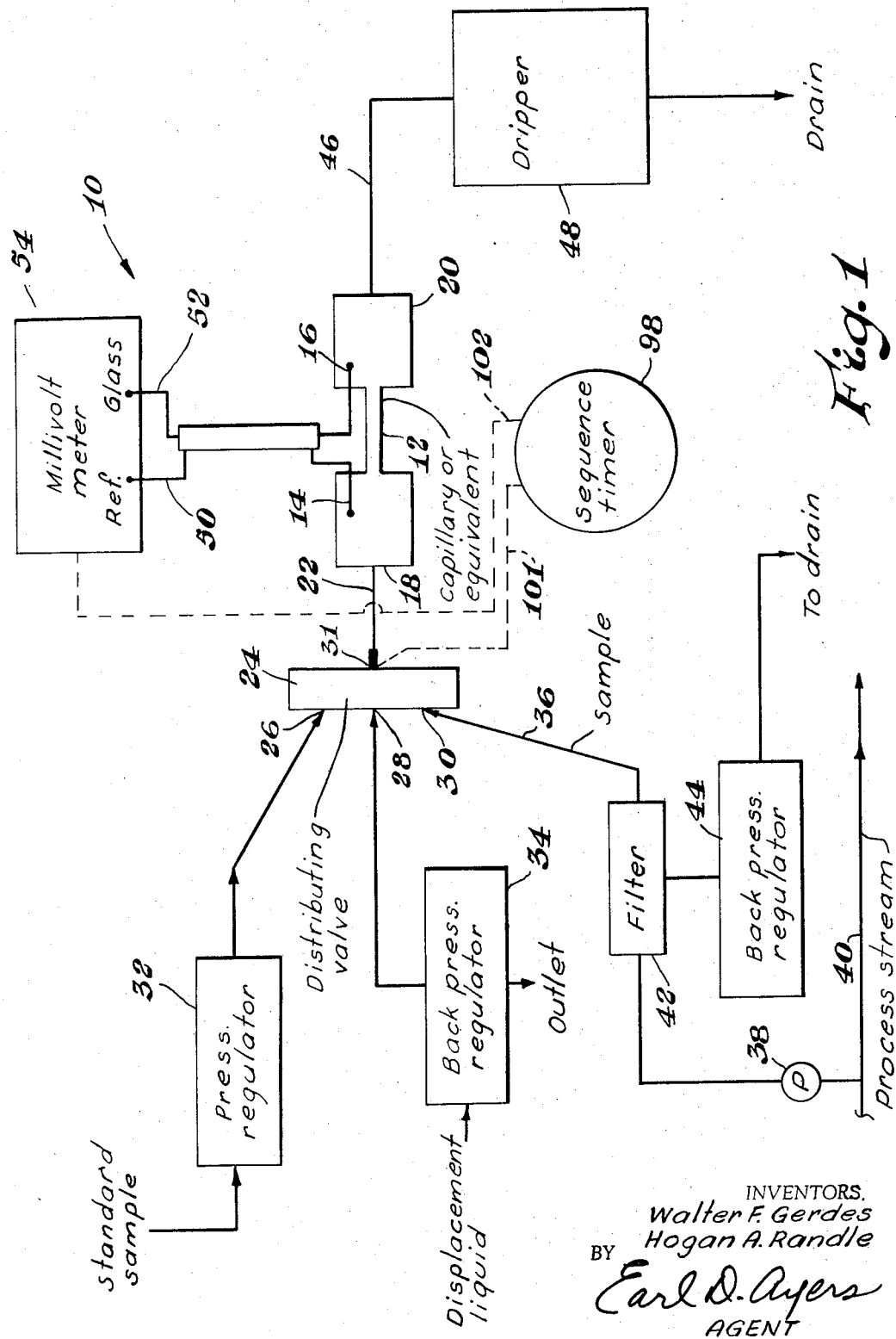
FIG. 1 is a diagrammatic view of an instrument made in accordance with this invention.

Referring to the drawing, there is shown signal generating apparatus, indicated generally by the numeral 10, in accordance with this invention.

The apparatus 10 comprises a capillary 12 having electrically insulating walls and having reversible electrodes 14, 16 (silver, silver chloride, for example) disposed at spaced-apart locations along or at the ends of the capillary and in the path of any stream flowed through the capillary.

As shown, the electrode 14 is at or near the input end, 18, of the capillary and the electrode 16 is at or near to the output end 20 of the capillary 12.

A conduit or tube 22, coupled to a distributing valve 24 at one end, has its other end coupled to the input end 18 of the capillary. The distributing valve 24 has three inputs 26, 28, 30 and an output 31. The input 26 is coupled to a source of standard sample which provides a sample stream at a predetermined pressure which is achieved by coupling the standard sample stream to a suitable pressure regulator 32, for example. The input 28 is coupled to a source of displacement water, usually distilled water, available, at constant pressure, as through the pressure regulator 34, for example.

The input 30 is coupled to a sample stream line 36 through which is pumped a sample stream at a predetermined velocity. A pump 38 is coupled to a process stream 40 or other source of material to be sampled. The output of the pump is passed through a filter (usually a 30 or 60 micron filter) 42. A back pressure regulator 44 is coupled to the filter on the input side thereof to assure that a constant pressure is applied to the filter input, the excess of sample usually going to a drain.

The output end 20 of the capillary 12 is coupled to a discharge line 46 which is coupled into a dripper device 48 which serves to break up the output stream from the capillary into discrete droplets and thereby prevent a low resistance stray electrical path from one electrode to the other externally of said flow path, before the stream is fed into a drain line, for example, or otherwise disposed of.

The electrodes 14, 16 are coupled by coaxial leads 50, 52 to the terminals of a pH Dynalog type of potential indicating meter or suitable millivolt meter 54 which has an input impedance of the order of 30 megohms. The electrode 14 is coupled to the outer or shield lead 50 and the electrode 16 is coupled to the center conductor 52 which is connected to the glass electrode terminal of the dynalog meter 54.

In operation, the distributing valve 24 is positioned so that the sample stream flows through the input 30 and capillary 12 and out through the dripper 48. The sample, as it flows through the capillary 12, develops a potential difference between the electrodes 14, 16, which is a function of the charge condition existing in the sample stream. However, because the ionic conductivity of the sample stream may be relatively large, the signal developed as the sample stream flows through the capillary is often small enough so that error potentials caused by such things as dis-symmetry of the electrodes 14, 16, for example, may give output readings which are not a true indication of the charge condition existing in the sample stream.

The valve 24, after the sample liquid has flowed through the capillary 12 for a sufficient time, 20 seconds, for example, to bring the capillary walls to equilibrium with the sample stream, is turned to apply displacement liquid, commonly distilled water or other water having low ionic conductivity, through the capillary 12 for a predetermined time, for example, about 20 seconds. The recorder or meter is read only during the final two seconds of flow of displacement fluid.

As the displacement liquid, usually distilled water, passes through the capillary, however, it has been found that the sample stream liquid is displaced from the capillary much easier than is the charge on the capillary wall which, as stated previously, is a function of the charge condition in the sample stream. Therefore, after a suitable time interval, 18 seconds, as mentioned above, during which time substantially all of the sample liquid has been displaced from the capillary 12, a reading is taken across the electrodes 14, 16 during the last two seconds that the displacement liquid is applied across the capillary. Since the ionic leakage path between the electrodes through the liquid stream is now insignificant because of the low ionic conductivity of the displacement liquid, the signal developed as the liquid streams past the material which adheres to the capillary walls is large as compared to the part of the signal which is due to electrode dis-symmetry etc. Thus, the signal developed while the displacement liquid passes through the capillary 12 is more likely to represent the average charge condition in the sample stream than is the case where only the sample liquid is passed through the capillary as the reading is taken.

The effect of taking the reading on the dynalog (millivolt) meter while the displacement liquid is being passed through the capillary is twofold. First, the meter reading is amplified because the potential drop is developed (between the electrodes 14, 16) across a higher impedance than is the case when a more electrically (ionically) conductive stream passes through the capillary. Also, when the measurement is made while displacement water flows through the capillary the signal developed more nearly represents the result only of the charge existing on particles in the stream since variations in the conductivity of the sample stream have been substantially eliminated by making the measurement only when the displacement liquid is passing through the capillary.

When the instrument is to be calibrated, the distribution valve 24 is set to connect input 26 to the input end of the capillary 12, thus substituting a standard sample for the unknown sample from the line 36. After the standard sample is passed through the capillary for a predetermined length of time, usually about 20 seconds, it is shut off and displacement water is passed through the capillary. After the requisite time interval, about 18 seconds, and while the displacement water continues to be pumped through the capillary for an additional two seconds, the output of the dynalog meter which is connected across the electrodes 14, 16 is connected to the indicator means for two seconds and a reading is taken.

The standard sample may, for example, be a colloidal solution or dispersion wherein the average charge on the particles has previously been determined by other means, such as by a Zeta meter, for example, which measures electrophoretic mobility of charged particles. If calibration over a wide range is desired, the use of various standard samples may be used.

The capillary may be made of glass or other ceramic, polyethylene, polystyrene, nylon, beeswax, paraffin, or polytetrafluoroethylene, for example. One capillary which has been used is composed of a ¾ inch length of ¼ diameter polytetrafluoroethylene rod having a hole drilled lengthwise through it with No. 72 drill (.025 inch diameter).

Alternatives to the capillary 12 may be used. For example, polyethylene tubing having a length of 85 feet and an inner diameter of 3/16 inch has been successfully used. Also, polyethylene tubing having a length of 60 feet and an inner diameter of .062 inch has been successfully used.

The dynalog type pH meter is very suitable as a potential measuring device with this invention, as mentioned previously, but any millivolt meter having a suitable range and high input impedance may be used as a substitute for it.

It is good practice to provide means for back flushing the filter 42 periodically. Such means comprise suitable valving arrangements whereby water may be pumped from the output end to the input end of the filter 42 (and thence to a drain, for example), but this type of arrangement is well known to those skilled in the art and is therefore not included in the drawing.

The apparatus heretofore described may be used to indicate the average charge density existing on surfaces present in the sample stream. Typical sample streams may be raw water, sewage, a latex, or oil-water emulsions, for example.

This instrument provides a measurement of the charge condition present in the process stream at intervals as close as 40 seconds, for example, whereas prior art instruments such as the so-called Zeta meter, require a considerably longer period of time and the constant attention of an operator to make a single determination of the charge present on a single particle which is present in a sample of the stream being studied.

In applications where it is desired to produce flocculation of the particles in the stream, the instrument is used to provide an indication of the end point of a titration operation in which a flocculant material such as alum, ferric chloride, or a suitable polymer such as polyethylenimine, for example, is added to the sample stream as the streaming potential (loosely speaking) is being measured by the instrument of this invention.

The use of the instrument of this invention in batch titration type operation is illustrated in FIG. 2.

Calibrated burettes 60, 62 are disposed with their valved lower ends above a reservoir 64 of distilled water or water of standardized salt content. The contents of the reservoir 64 are coupled to the streaming potential instrument 66 by the line 68 and pump 70 (the line 68 and pump 70 corresponding generally to line 36 and pump 38 in FIG. 1). As the contents of the reservoir are pumped through the capillary (not shown) of the instrument in FIG. 2, the effluent is recycled through line 72 and dripper 74 to the reservoir 64. For the sake of convenience, a conventional recorder 76, adjusted to indicate potential on either side of a neutral point, is coupled to the output of the instrument 66.

In operation, a predetermined amount of a cationic treating material to be analyzed, such as polyethylenimine, for example, is dispersed from the burette 62 into the reservoir 64. Then, with the instrument 66 in operation, discrete amounts of a known standard anionic reagent, such as alkylbenzene sulfonate, are dispensed into the reservoir 64. The amount of anionic reagent required to neutralize the cationic material, as indicated by zero output on the instrument, is recorded. The strength of the cationic material is then conventionally calculated by multiplying the known strength of the anionic material by the volume of the anionic material dispensed into the reservoir 64 and dividing by the volume of the cationic material dispensed into the reservoir 64.

Since, in general, the exact deviation of the equivalence point from zero reading to be expected when titrating one material with another will be unknown, the trick of making a second titration after the first titration is very useful in titrating charge. First, an aliquot of sample is titrated to the neutral point or zero millivolts as indicated by the instrument. Then a second aliquot of the same sample is added to the neutral mixture and the composite is titrated. The first titration is ignored and the second is taken as the true titer of the sample.

The procedure described above is useful in quality control operations, for example, in which different batches of product must be compared to determine their relative effectiveness, as in the case of cationic flocculants, for example.

FIG. 3 illustrates the use of the instrument of this invention in an overall automatic system for controlling the addition of a treating agent, such as a flocculant, for example, to an aqueous stream of material to be treated.

The stream 80 being treated has a treating material reservoir 82 coupled to it through a line 84 and a pneumatically controlled valve 86. Downstream from the treating reservoir a suitable distance to permit the treating material to become well mixed with the stream under treatment, a sample is passed through a streaming potential measuring instrument 88 of the type shown in FIG. 1, for example, wherein the stream 80 corresponds to the process stream 40 in FIG. 1.

The potential developed in the instrument 88 is coupled to a recorder 90 which has a suitable potential range each side of a neutral point and to a pneumatic controller 92 having a set point which can be adjusted to correspond to a predetermined output potential of the streaming potential instrument 88. The pneumatic controller is coupled, as by the line 94, to the previously mentioned pneumatic control valve 86.

In operation, a predetermined amount of treating material (flocculant, for example) is fed into the stream to be controlled (flocculated, for example) and becomes mixed (either naturally or by mixing means not shown) before passing the point along the stream where the sample is removed. If the potential developed in the instrument 88 is of the proper value (set point potential), no change in the setting of the valve 86 occurs. However, if the potential developed in the instrument 88 is lesser or greater than that of the set point of the pneumatic controller 92, then the controller 92 actuates the valve 86 to either increase the flow or decrease the flow of treating material which is applied to the stream 80. As a practical matter, the pneumatic controller 92 and potential recorder 90 are usually combined in a single unit, as indicated by the dashed lines 96.

In order not to shock the control system with potential readings which are unrelated to the charge existing on the particles in the stream being sampled, it is necessary to deenergize the driving means of the recording pen at all times except the two second interval, for example, when an actual potential reading is made near the end of the part of the operating cycle where displacement water is passed through the capillary.

Because the recorder pen position is a function of the potential measured by the instrument 88, any movement of the pen other than that which takes place during the time a potential measurement is being made across the capillary electrodes would adversely affect the effectiveness of the control system.

Deenergizing the pen drive motor has the effect of providing a memory to the recorder output because the pen stays in the position corresponding to the last measured potential until the pen drive motor is again energized during the time the next potential reading is made. Since a potential reading may be made at less than one minute intervals and the sample stream changes its charge characteristics usually at a rate which is at least that slow, holding the dosage of flocculant at a steady rate between measurements by the instrument 88 serves to adequately control changes in dosage of the stream.

The sequence timer 98, shown in FIG. 1, is coupled to the output 31 of the distribution valve 24 and to the recorder 54 in FIG. 1, as shown by the dotted lines 100, 102, respectively. The timer 98 may be, for example, a simple 3 cam timer in which the sample stream cam and displacement water flow cams are in the "on" position for equal and supplemental lengths of time and the pen driving cam switch is in the "on" position only during the last two seconds of the displacement water cycle.

As previously mentioned, the range of the recorder is chosen to match the signal developed in the instrument 88 which potential is influenced by factors such as pressure at the capillary and the expected range of streaming potential (related to Zeta potential) of the sample.

While the capillary 12 and the tubes disclosed as capillary substitutes have been described as being composed of electrically insulating material, it is acknowledged that capillaries having metal inner walls which are very thin may be used. Such metal walled capillaries have such a thin coating of metal that actually, though the walls are not made of insulating material, a high resistance electrical path does exist between the ends of the capillary. Thus, depending on the sensitivity of other equipment of the instrument such a capillary may prove practicable for use in this invention.

The wall or walls of the flow path may be made of insulating material while the remainder of the structure of the flow path may be made of any suitable insulating or noninsulating material.

It is to be understood that the material flowed over or along the flow path flows in excess of some predetermined velocity, usually a constant velocity, which provides output signals across the electrodes which are in a usable range. In the illustrated embodiments pressure regulation is used to assure the predetermined velocity of flow of material along the flow path, but gravitational flow (in some situations) or metered flow controls could, for example, be used to assure the requisite flow velocity.

What is claimed is:

1. Apparatus for determining the charge condition which is present in flowable material comprising liquid and particles, comprising a flow path including a capillary having electrically insulating walls and an input and output, means for measuring small electrical potentials, a pair of spaced apart electrodes, said electrodes being disposed in said flow path and adapted to contact flowable material traveling along said path and said capillary being between said electrodes, timing means coupled to the input of said flow path for sequentially flowing said material and then a displacement liquid along said flow path, and means for coupling said means for measuring small electrical potentials to said electrodes.

2. Apparatus in accordance with claim 1, wherein said device for detecting small electrical potentials has an output which drives potential indicating apparatus, and means are provided for coupling said output to said indicating apparatus for a predetermined time during which the displacement liquid flows along said flow path.

3. Apparatus in accordance with claim 2 wherein said indicating apparatus is a movable recording pen.

4. Apparatus in accordance with claim 1, wherein said timing means is coupled to the actuating means of a distribution valve.

5. Apparatus in accordance with claim 1, wherein said electrodes are reversible.

6. Apparatus in accordance with claim 1, wherein said device for detecting small electrical potentials is a high input impedance device.

7. Apparatus in accordance with claim 1, wherein said capillary walls are made of polytetrafluorethylene.

8. Apparatus in accordance with claim 1, wherein said capillary walls are ceramic.

9. Apparatus in accordance with claim 1, wherein said capillary walls are made of polyethylene.

10. Apparatus in accordance with claim 1, wherein said capillary walls are made of polystyrene.

11. Apparatus in accordance with claim 1, further including means adapted to maintain said material and liquid at a rate of flow which exceeds predetermined flow rates.

12. Apparatus in accordance with claim 1, wherein said means for flowing said material includes a filter adapted to retain particles above a predetermined size.

13. Apparatus in accordance with claim 1, wherein means are provided for preventing a low resistance stray electrical path from one electrode to the other externally of said flow path.

References Cited

UNITED STATES PATENTS

| | | | |
|---|---|---|---|
| 2,656,508 | 10/1953 | Coulter | 324—71 |
| 2,993,846 | 7/1961 | Tyler | 204—195 |
| 3,015,775 | 1/1962 | Coulter | 324—30 |
| 3,208,919 | 9/1965 | Sennett et al. | 204—195 |
| 3,214,354 | 10/1965 | Capuano et al. | 204—195 |
| 3,238,128 | 3/1966 | Gustafson | 137—5 |
| 3,299,354 | 1/1967 | Hogg | 324—71 |

HOWARD S. WILLIAMS, *Primary Examiner.*

T. TUNG, *Assistant Examiner.*